US012613103B1

(12) United States Patent
Seefeldt et al.

(10) Patent No.: US 12,613,103 B1
(45) Date of Patent: Apr. 28, 2026

(54) VEHICLE DIAGNOSTIC AWARE ROUTE PLANNING SYSTEM

(71) Applicant: Samsara Inc., San Francisco, CA (US)

(72) Inventors: Benjamin Seefeldt, Saint Paul, MN (US); Jennifer Nguyen, San Francisco, CA (US); James Patterson, San Francisco, CA (US); John Charles Bicket, Burlingame, CA (US); Meelap Shah, Portland, OR (US); Noah Paul Gonzales, Sebastopol, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 19/207,039

(22) Filed: May 13, 2025

(51) Int. Cl.
*G01C 21/34* (2006.01)
*G07C 5/08* (2006.01)

(52) U.S. Cl.
CPC ..... *G01C 21/3461* (2013.01); *G01C 21/3492* (2013.01); *G07C 5/0808* (2013.01); *G07C 5/0816* (2013.01)

(58) Field of Classification Search
CPC ........... G01C 21/3461; G01C 21/3492; G07C 5/0808; G07C 5/0816
See application file for complete search history.

(56) References Cited

U.S. PATENT DOCUMENTS

| | | | |
|---|---|---|---|
| 9,921,070 B1* | 3/2018 | Nimchuk | G01C 21/3679 |
| 2022/0003561 A1* | 1/2022 | Shoval | G01C 21/3415 |

* cited by examiner

*Primary Examiner* — Michael V Kerrigan
(74) *Attorney, Agent, or Firm* — Schwegman Lundberg & Woessner, P.A.

(57) ABSTRACT

Systems and methods are provided for vehicle diagnostic aware route planning and navigation. A route management system receives diagnostic data from vehicle diagnostic harnesses and analyzes it along with historical vehicle data to determine vehicle parameters and potential routing conflicts. The system detects vehicle conditions through diagnostic codes or sensor data and determines appropriate route modifications based on factors including vehicle location, service requirements, and delivery schedules. Vehicle attributes are determined through analysis of both VIN data and diagnostic signals to create comprehensive vehicle profiles for routing purposes. When conflicts are detected, the system can modify routes to include service locations or identify replacement vehicles based on compatible configurations. The system provides enhanced visibility through an interface that displays vehicle conditions, estimated service delays, and route modifications while considering factors such as weather, construction zones, and geofenced areas.

20 Claims, 7 Drawing Sheets

200

ROUTE MANAGEMENT SYSTEM
124

PROCESSORS
208

DIAGNOSTIC MODULE 202

HISTORICAL DATA MODULE 204

ROUTE ANALYSIS MODULE 206

PRESENTATION MODULE 208

300

400

500

RECEIVE DIAGNOSTIC AND VIN DATA
502

ANALYZE DATA
504

DETERMINE VEHICLE ATTRIBUTES
506

CHECK ROUTE RESTRICTIONS
508

IDENTIFY ROUTE CONFLICTS
510

MODIFY ROUTE
512

REROUTE VEHICLE
514A

DEPLOY REPLACEMENT
514B

VEHICLE DIAGNOSTIC AWARE ROUTE PLANNING SYSTEM

TECHNICAL FIELD

The present disclosure relates to vehicle navigation systems and fleet management, particularly systems and methods for routing and tracking vehicles across multiple stops while managing vehicle diagnostic information and fleet operations.

BACKGROUND

Vehicle navigation systems and fleet management have become increasingly important for efficiently managing commercial vehicle operations. Traditional navigation systems provide basic routing capabilities based on road maps and traffic conditions. Fleet management systems help track vehicle locations and manage delivery schedules across multiple stops.

Modern commercial vehicles are equipped with diagnostic systems that collect data about vehicle operations and performance through diagnostic harnesses. This diagnostic data provides insights into vehicle status, maintenance needs, and operating characteristics. Fleet operators use this diagnostic information to maintain their vehicles and manage fleet operations.

Vehicle identification number (VIN) data and other vehicle specifications are used to track vehicle attributes like dimensions, weight limits, and equipment configurations. These attributes affect which roads and areas vehicles can safely access based on various restrictions like bridge weight limits, height clearances, and local regulations.

Historical fleet data, including maintenance records and service histories, helps fleet operators understand patterns in vehicle operations and optimize their fleet management decisions. This data enables more informed choices about vehicle assignments, maintenance scheduling, and route planning.

Efficient fleet management requires coordinating multiple vehicles across various stops while considering factors like road conditions, weather, construction zones, and other route attributes that may affect vehicle operations. Fleet operators must balance on-time delivery requirements with vehicle capabilities and operating restrictions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
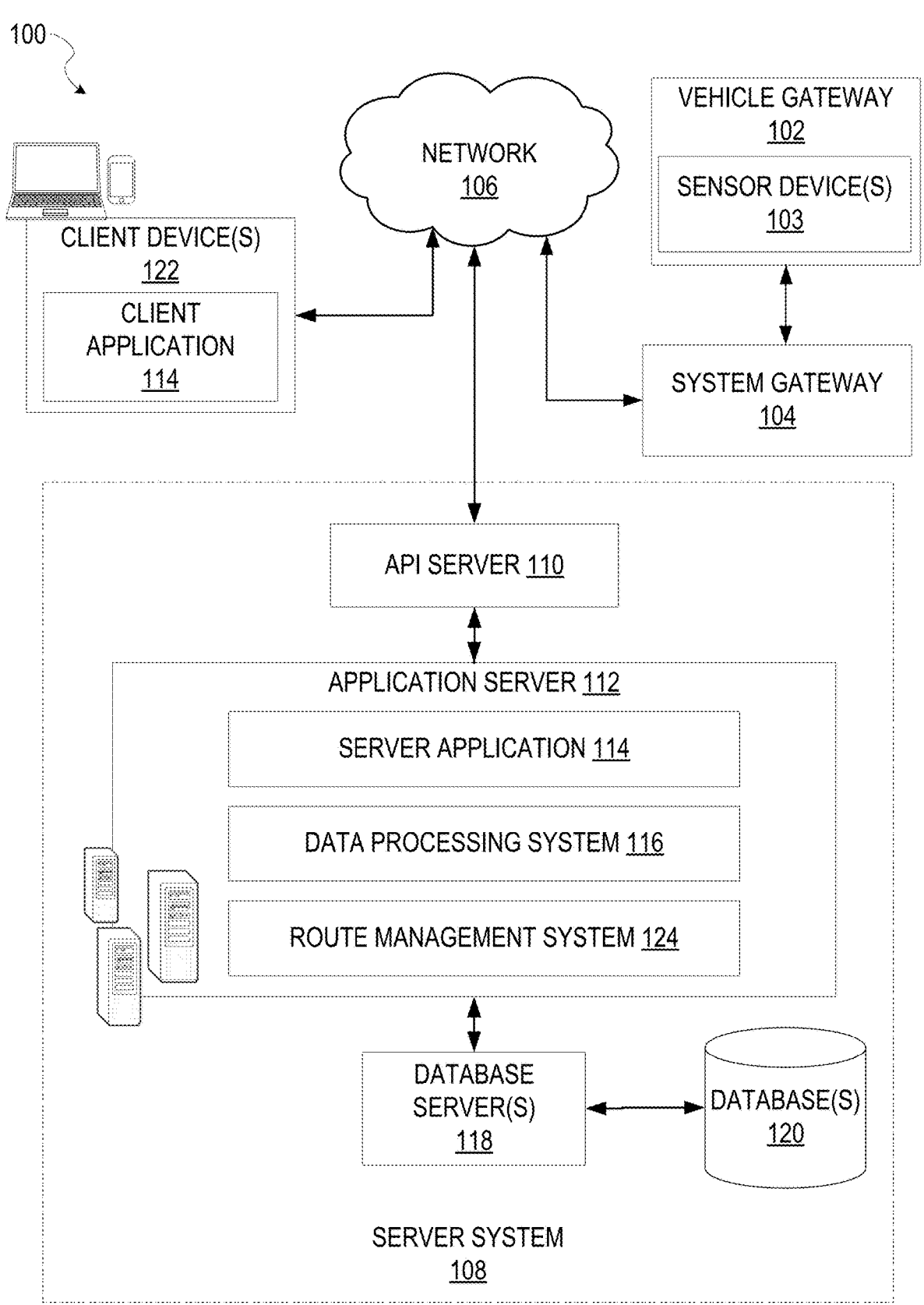
FIG. 1 is a block diagram showing an example system for vehicle diagnostic aware route planning, according to certain example examples.

Vehicle fleet operators face significant challenges in efficiently managing their fleets while accounting for various vehicle conditions, capabilities, and route restrictions. Traditional navigation and fleet management systems provide basic routing based on maps and traffic but fail to effectively integrate real-time diagnostic data and historical vehicle information to optimize routes and prevent conflicts.

According to certain examples, systems and methods are described for intelligent route modification based on vehicle diagnostic data and historical information. A vehicle diagnostic harness provides real-time data about the vehicle's status, which is analyzed along with historical vehicle data to determine vehicle parameters that may affect routing.

In some examples, the system receives diagnostic data from a vehicle's diagnostic harness while the vehicle is traveling on a route with multiple stops. The diagnostic data may indicate various vehicle conditions, such as fault codes, maintenance needs, or fuel levels. The system analyzes this diagnostic data along with historical service records to determine the severity of any detected conditions and estimate potential service delays.

Based on detected vehicle conditions, the system may automatically modify the vehicle's route to include appropriate service locations. For example, if low fuel is detected, the system may identify preferred fuel providers along the route and modify navigation to include a fuel stop. For maintenance-related fault codes, the system can estimate repair times based on historical data and route the vehicle to repair facilities or truck stops as appropriate.

In some examples, the system determines vehicle attributes by analyzing both diagnostic harness data and vehicle identification number (VIN) data. This analysis enables "fingerprinting" of vehicles to identify specific configurations, auxiliary equipment, dimensions, and weight characteristics. The system can detect, for example, whether a vehicle is configured as a cement mixer versus a dump truck, even when vehicles share the same basic chassis, based on the diagnostic harness data.

In some examples, the system determines vehicle fingerprints by analyzing both Vehicle Identification Number (VIN) data and diagnostic harness information to create a comprehensive profile of vehicle attributes and capabilities. The fingerprinting process examines signals and data from the diagnostic harness along with VIN information to determine specific vehicle configurations, installed auxiliary equipment, dimensions, and weight characteristics.

For example, while two vehicles may share the same factory chassis according to their VIN data, the fingerprinting process can detect differences in their configurations by analyzing additional diagnostic signals that indicate the presence of specialized equipment, such as distinguishing between a cement mixer versus a dump truck configuration. This detailed vehicle profiling enables the system to identify truly compatible replacement vehicles by matching not just basic vehicle types, but also specific configurations and capabilities required for completing particular routes.

The system identifies route attributes such as road restrictions, weather conditions, construction zones, and geofenced areas. By comparing vehicle parameters against route attributes, the system can detect potential conflicts—for instance, when a vehicle's dimensions or weight would violate road restrictions.

In some examples, the system enables specification of geofences and risk zones to avoid during route planning. These zones can be company-created or auto-computed based on configurable thresholds for various risk factors including crime statistics. Users can specify minimum threshold levels for crime rates, above which the system will automatically plan routes to avoid those areas during both advance planning and real-time navigation.

When conflicts are detected, the system can either modify the route to avoid restricted areas or, in cases of severe vehicle conditions, automatically identify and dispatch replacement vehicles. Replacement vehicles are selected based on matching vehicle fingerprints to ensure they have compatible configurations and capabilities for the assigned route.

The system provides enhanced dispatcher visibility by displaying vehicle conditions, route modifications, and estimated delay times. For maintenance issues, the system can automatically alert dispatchers of critical engine problems and facilitate route reassignment when necessary.

Historical vehicle data is continuously analyzed to improve service time estimates and conflict prediction. The system learns from past service records to better estimate repair durations for specific fault codes and understand which vehicle conditions require immediate attention versus those that can be addressed during scheduled maintenance.

Route planning may consider various factors including expected traffic patterns, appointment times, weather forecasts, and construction zones detected through vehicle cameras. The system can dynamically reroute vehicles around severe weather or construction areas when conflicts with vehicle parameters are detected.

The system may overlay relevant points of interest on navigation displays, including company depots, repair facilities, fuel stations, and areas with known operational challenges like harsh braking zones or accident-prone locations. This information helps drivers and dispatchers make informed routing decisions based on vehicle conditions and capabilities.

Vehicle diagnostic monitoring can trigger various automated responses based on detected parameters. These may include suggesting maintenance stops, rerouting for fuel, or complete route reassignment. The system considers factors like current vehicle location, route progress, and availability of replacement vehicles when determining appropriate modifications.

FIG. 1 is a block diagram showing an example system 100 for vehicle diagnostic aware route planning, according to certain examples. The system 100 includes one or more client devices 122 that host applications including a client application 114.

The client application 114 communicates and exchanges data with the server application 114 executed at the server system 108 via the network 106. The data exchanged between the client application 114 and the server system 108 includes vehicle diagnostic data, route information, and navigation instructions.

The server system 108 provides server-side functionality via the network 106 to the client application 114, vehicle gateway 102, and system gateway 104. While certain functions of the system 100 are described as being performed by either the client application 114, vehicle gateway 102, system gateway 104, or server system 108, the location of functionality may be distributed based on processing capacity and technical requirements.

The server system 108 supports various services and operations provided to the client application 114. Such operations include transmitting data to, receiving data from, and processing data generated by the client application 114, vehicle gateway 102, and system gateway 104. The vehicle gateway 102 includes sensor devices 103 configured to collect vehicle diagnostic data through the vehicle diagnostic harness. This data includes vehicle conditions, fault codes, and operational parameters.

The server system 108 includes an Application Program Interface (API) server 110 coupled to an application server 112. The application server 112 is communicatively coupled to a database server 118, which facilitates access to databases 120 storing vehicle diagnostic data, historical vehicle data, and route information.

The API server 110 receives and transmits data between the client device 122 and application server 112. The API server 110 provides interfaces that can be called by the client application 114 to invoke functionality of the application server 112, including route modifications, service scheduling, and vehicle reassignment.

The application server 112 hosts applications including a server application 114 and a route management system 124. The route management system 124 is configured to analyze vehicle diagnostic data, determine vehicle parameters, detect conflicts with route stops, and modify routes accordingly. Further details of the route management system 124 can be found in FIG. 2.

The server application 114 implements data processing technologies related to processing diagnostic data from the vehicle gateway 102. The data is analyzed to determine vehicle conditions and attributes before being used for route planning and modification.

The application server 112 is communicatively coupled to database server 118, which facilitates access to databases 120 storing historical vehicle data, service records, and route information used for analyzing vehicle parameters and determining route modifications.

Figure 2:
FIG. 2 is a block diagram illustrating components of the route management system that configure the system to perform operations for vehicle diagnostic aware route planning, according to certain examples.

FIG. 2 is a block diagram 200 illustrating components of the route management system 124 that configure the system to perform operations for vehicle diagnostic aware route planning, according to certain examples. The route management system 124 includes multiple modules configured to perform specialized functions related to processing vehicle diagnostic data and modifying routes.

The diagnostic module 202 is configured to receive and analyze diagnostic data from vehicle diagnostic harnesses and VIN data. The module identifies vehicle conditions such as fault codes and determines vehicle attributes including configurations, dimensions, and equipment types.

The historical data module 204 processes historical vehicle data including service records and repair times. This module analyzes maintenance patterns to estimate service delays, determine fault severity, and validate vehicle attributes identified through diagnostic analysis.

The route analysis module 206 identifies route attributes and detects conflicts between vehicle parameters and route requirements. The module analyzes road restrictions, weather conditions, construction zones, and geofenced areas to determine when vehicle conditions or attributes are incompatible with planned routes.

The presentation module 208 manages the display of route modifications, service notifications, and dispatcher alerts. This module provides navigation instructions incorporating route changes and presents relevant information about vehicle conditions, estimated delays, and replacement vehicle options through user interfaces.

The processors 208 execute instructions to implement the functionality of the various modules described above. The processors coordinate the analysis of diagnostic data, historical information, and route attributes to enable intelligent route modifications based on vehicle parameters.

Figure 3:
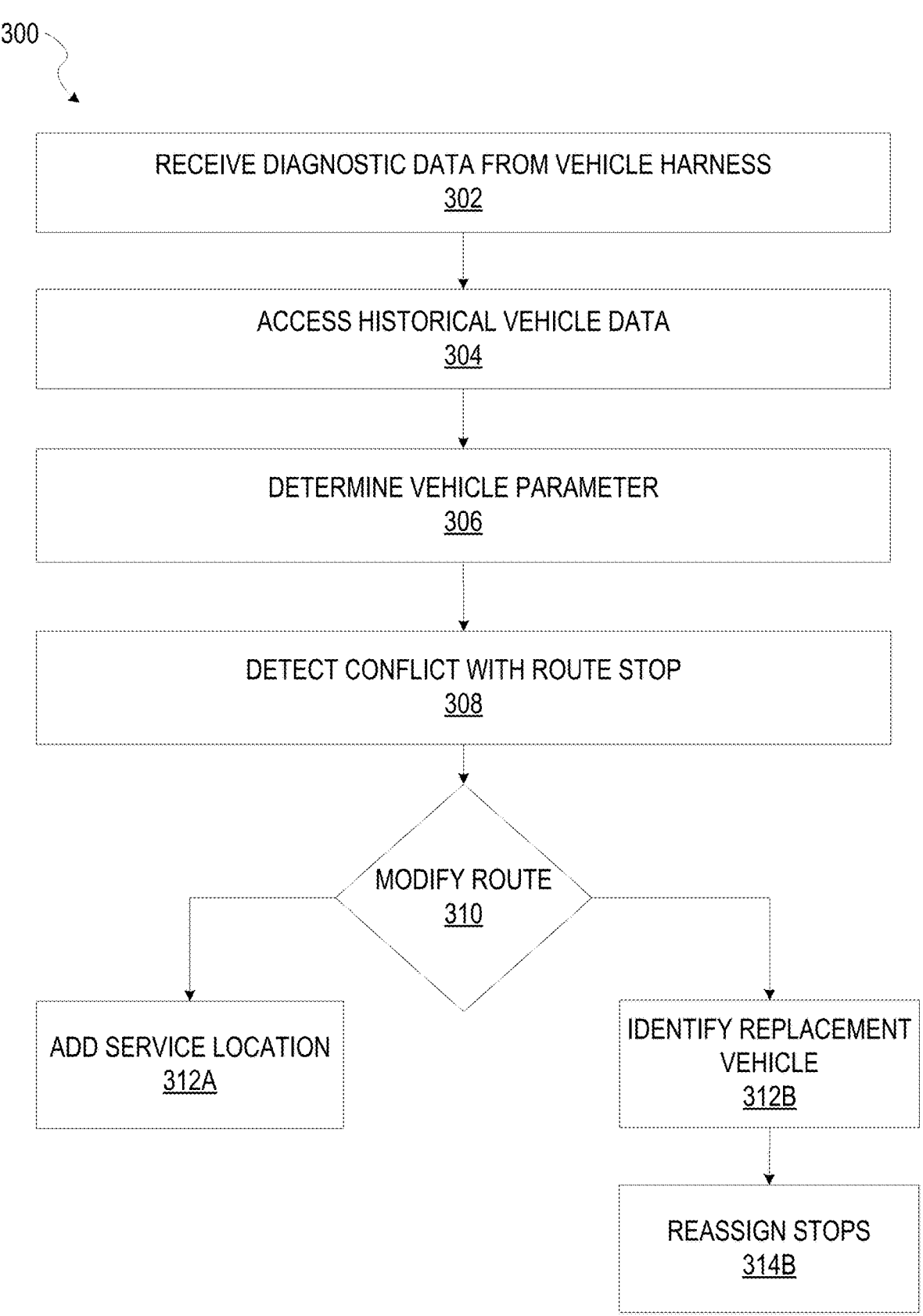
FIG. 3 is a flowchart depicting a method of vehicle diagnostic aware route planning, according to certain examples.

FIG. 3 is a flowchart 300 depicting a method of vehicle diagnostic aware route planning, according to certain examples. The method includes operations for receiving diagnostic data, analyzing vehicle parameters, detecting conflicts, and modifying routes based on detected conflicts.

At operation 302, the system receives diagnostic data from a vehicle diagnostic harness of a vehicle assigned to a route comprising one or more stops. The diagnostic data provides information about vehicle conditions, fault codes, and operational parameters through the vehicle's diagnostic system.

In some examples, the system identifies route attributes such as road restrictions, weather conditions, construction zones, and geofenced areas. For crime-based routing, the system can analyze municipal crime statistics by zip code or address to automatically compute high-risk zones. Users can configure crime threshold levels above which routes will be automatically modified to avoid those areas.

At operation 304, the system accesses historical vehicle data based on the received diagnostic data. In certain examples, this involves analyzing maintenance records, service histories, and repair time data to understand patterns and estimate potential service delays for detected vehicle conditions.

At operation 306, the system determines a vehicle parameter based on the diagnostic data and historical vehicle data. The vehicle parameter may comprise vehicle conditions like fault codes, or vehicle attributes such as configurations, dimensions, auxiliary equipment, and weight characteristics determined through analysis of diagnostic and VIN data.

At operation 308, the system detects a conflict with a route stop based on the determined vehicle parameter. This may involve identifying route attributes such as road restrictions, weather conditions, construction zones, or geofenced areas and determining incompatibilities between these attributes and the vehicle parameter.

At operation 310, the system modifies the route based on the detected conflict. In certain examples, this modification may involve adding a service location to address vehicle conditions, or identifying and deploying a replacement vehicle when vehicle parameters conflict with route requirements. Based on analysis of the vehicle parameter and conflict type, the method branches into one of two modification paths.

In a first modification path at operation 312A, when the vehicle parameter indicates a maintenance need or service requirement, the system may add a service location to the route. The system estimates service delay duration based on historical data for similar conditions and incorporates the service stop into the route while minimizing delivery disruptions.

In a second modification path at operation 312B, when the vehicle parameter indicates an incompatibility with route requirements, the system identifies a replacement vehicle.

The system analyzes vehicle fingerprints to identify compatible replacement vehicles with appropriate configurations and capabilities for completing the route.

Following the second path, at operation 314B, the system reassigns stops to the identified replacement vehicle. The system automatically transfers remaining route stops to the replacement vehicle and provides updated navigation instructions to complete the deliveries.

Figure 4:
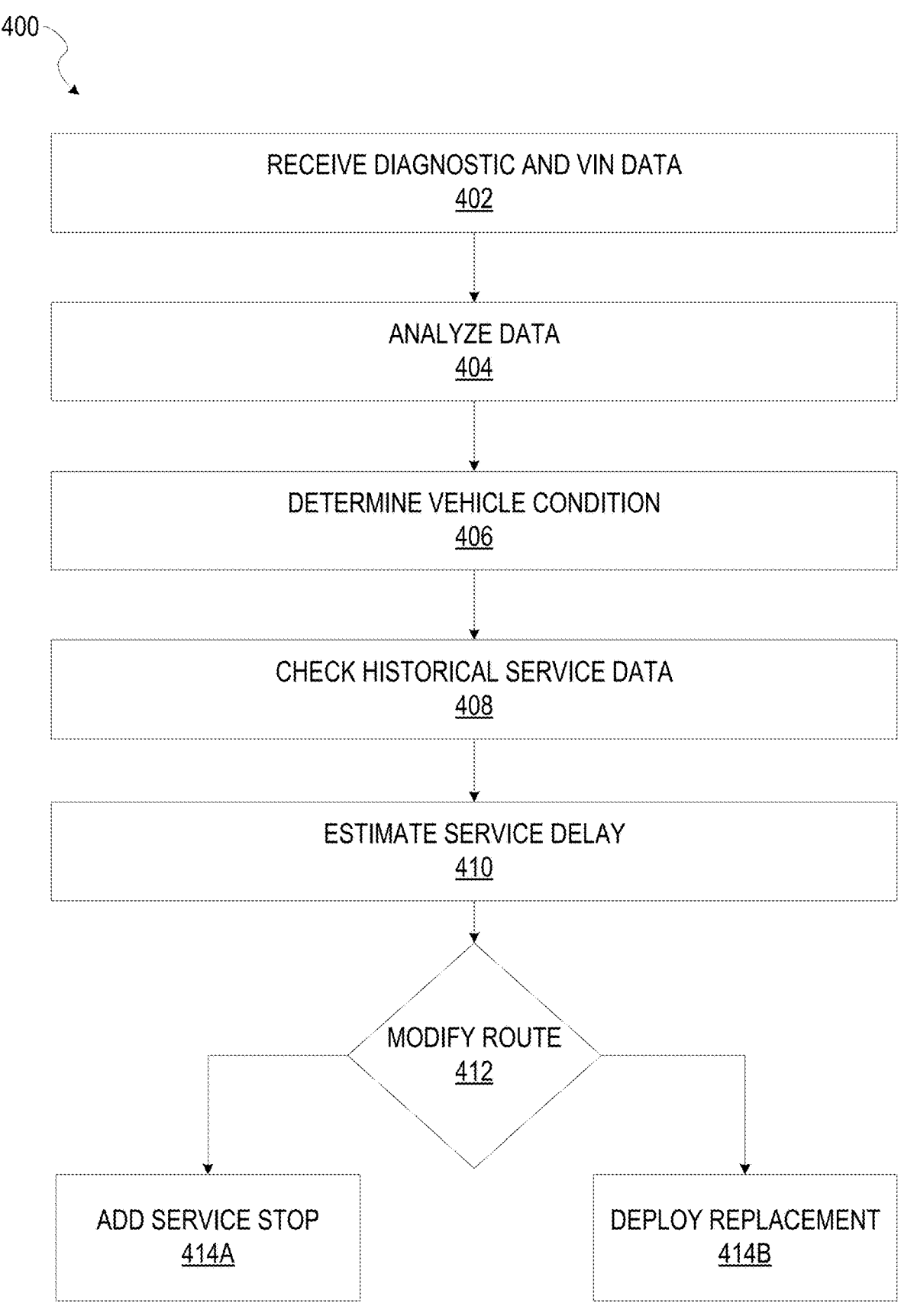
FIG. 4 is a flowchart depicting a method of diagnostic-based vehicle service routing, according to certain examples.

FIG. 4 is a flowchart 400 depicting a method of diagnostic-based vehicle service routing, according to certain examples. The method includes operations for analyzing vehicle diagnostic data, estimating service delays, and modifying routes based on vehicle conditions.

At operation 402, the system receives diagnostic data and VIN data from a vehicle. The diagnostic data provides information about vehicle conditions and fault codes through the vehicle's diagnostic harness, while the VIN data helps identify base vehicle configurations.

At operation 404, the system analyzes the received diagnostic and VIN data to create a comprehensive vehicle profile. This analysis examines signals and data patterns that indicate specific vehicle configurations and conditions.

At operation 406, the system determines a vehicle condition based on the analyzed data. The system identifies specific fault codes, maintenance needs, or other operational issues that may require service attention.

At operation 408, the system checks historical service data related to the determined vehicle condition. The system analyzes past service records and repair times for similar conditions to understand typical resolution patterns.

At operation 410, the method includes estimating a service delay based on the historical data analysis. The system analyzes past service records to calculate an expected repair duration and a confidence score indicating the likelihood of a quick roadside repair versus a more serious service need. The system compares the estimated delay duration to configurable threshold values to determine the appropriate modification path.

At operation 412, based on the analysis of the service delay estimate and confidence scores, the system determines a modification path by evaluating multiple factors. The system considers whether the estimated delay exceeds a threshold duration, examines the confidence score for successful roadside repair, checks the availability of nearby service locations, and assesses the criticality of remaining route stops to determine the most appropriate course of action.

When the estimated delay is below the threshold value and the confidence score indicates a high likelihood of quick repair, the method proceeds to operation 414A to add a service stop to the route. The system identifies service locations within an acceptable detour range, calculates optimal route modifications to minimize delivery disruptions, and updates estimated arrival times for remaining stops based on the anticipated service duration.

Alternatively, when either the estimated delay exceeds the threshold or the confidence score indicates a likely serious repair need, the method proceeds to operation 414B to deploy a replacement vehicle. In this case, the system identifies compatible replacement vehicles using vehicle fingerprint matching, transfers remaining route stops to the replacement vehicle, and routes the affected vehicle to an appropriate service facility for repairs.

Figure 5:
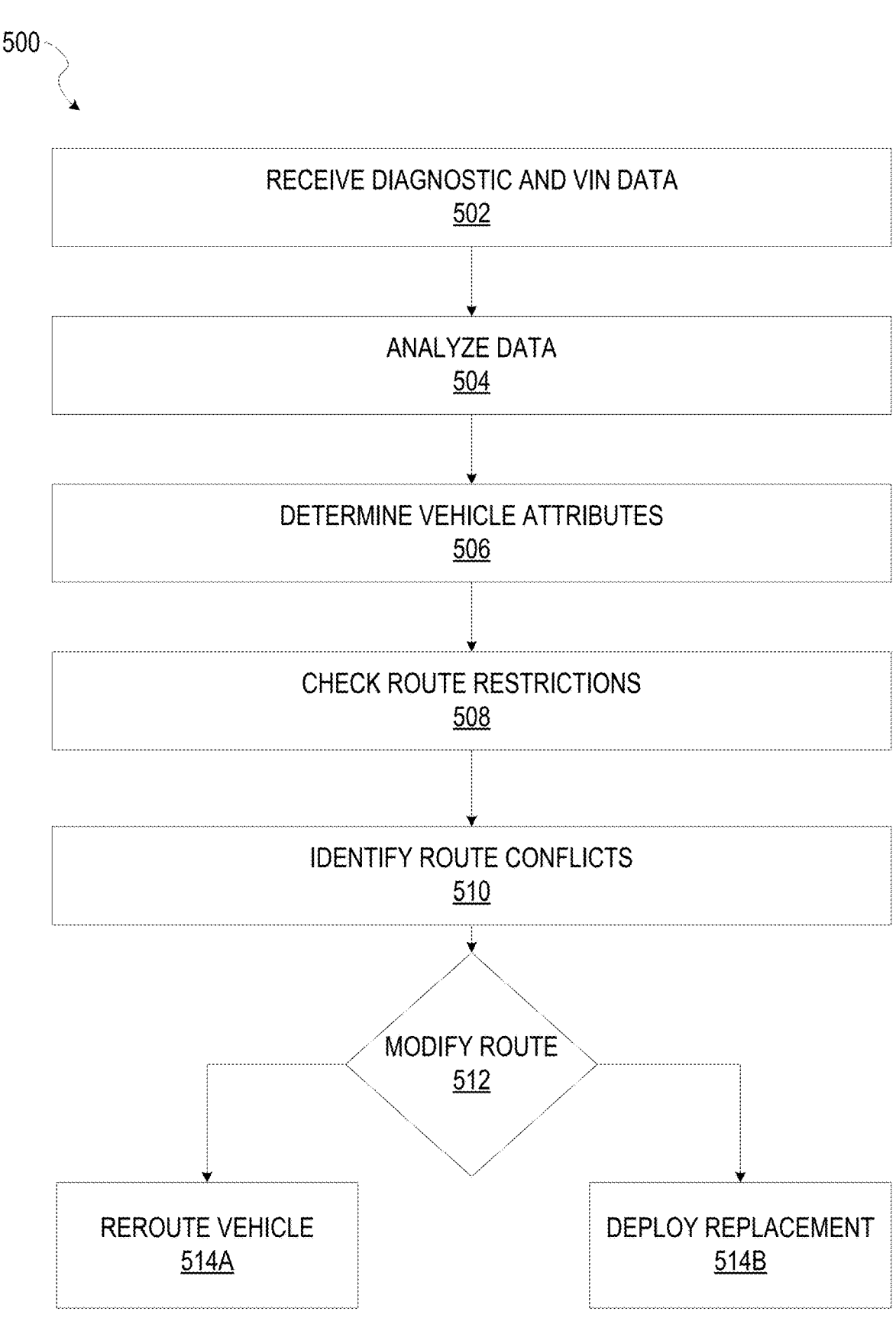
FIG. 5 is a flowchart depicting a method of vehicle attribute-based route modification, according to certain examples.

FIG. 5 is a flowchart 500 depicting a method of vehicle attribute-based route modification, according to certain examples. The method includes operations for analyzing vehicle diagnostic and VIN data to determine vehicle attributes and identify route conflicts.

At operation 502, the system receives diagnostic data and VIN data from a vehicle. The diagnostic harness provides operational data while the VIN data contains base vehicle information that helps identify vehicle configurations and characteristics. The system examines signals and patterns from both data sources to create a comprehensive vehicle fingerprint through analysis at operation 504.

At operation 506, the system determines vehicle attributes based on the analyzed data. The system identifies specific configurations, auxiliary equipment installations, dimensions, and weight characteristics by combining VIN information with diagnostic signals that indicate installed equipment types and configurations. For example, the system can distinguish between vehicles sharing the same base chassis but configured differently, such as cement mixers versus dump trucks.

At operation 508, the system checks route restrictions along the planned route. The system identifies attributes such as road weight limits, height clearances, weather conditions, construction zones, and geofenced areas that may affect vehicle routing. At operation 510, the system compares the determined vehicle attributes against these route restrictions to identify potential conflicts, evaluating whether vehicle configurations, dimensions, or equipment types are incompatible with identified route attributes.

At operation 512, based on the identified conflicts, the system determines an appropriate modification path by evaluating multiple factors. The system considers the severity of detected conflicts, available alternative routes, impact on delivery schedules, and availability of replacement vehicles to determine the most appropriate course of action.

When conflicts can be avoided through alternate routing, the method proceeds to operation 514A to reroute the vehicle. The system identifies routes that avoid restricted areas, calculates optimal alternative paths, and updates navigation instructions accordingly. Alternatively, when conflicts cannot be resolved through rerouting, the method proceeds to operation 514B to deploy a replacement vehicle. In this case, the system identifies compatible replacement vehicles using vehicle fingerprint matching, ensures replacement vehicle attributes meet route requirements, and transfers remaining stops to the replacement vehicle.

Figure 6:
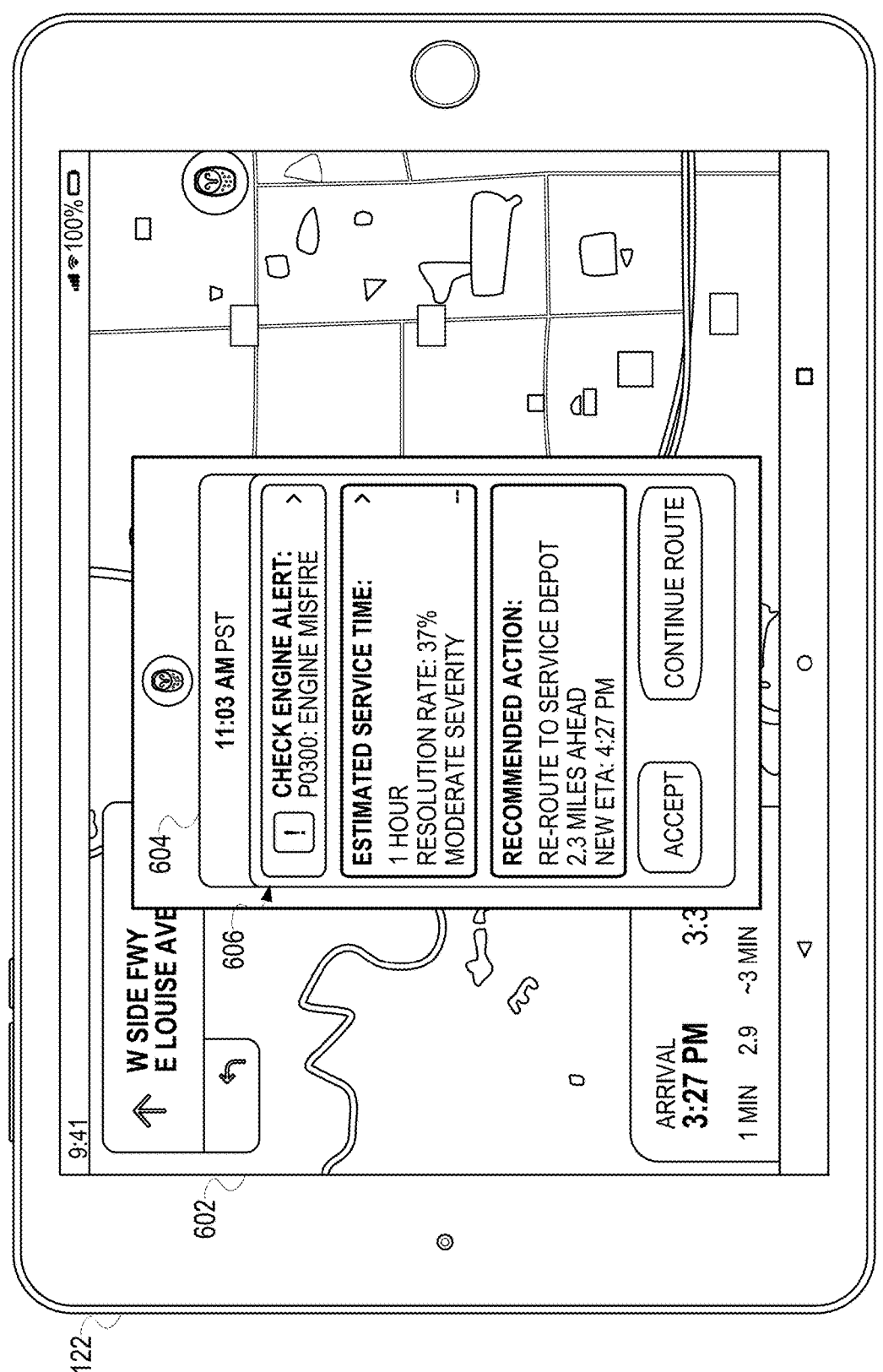
FIG. 6 illustrates an exemplary interface diagram showing a data query interface for interacting with the entity-based query system, according to certain examples.

FIG. 6 illustrates an exemplary interface diagram 600 displaying a notification that may be presented by a diagnostic-aware navigation system, according to certain examples. The interface is presented on a client device 122 that communicates with the route management system 124 through the network 106.

As seen in the diagram 600, the interface 602 includes a map view showing current navigation information with street identifiers. A diagnostic alert notification 604 is prominently displayed, triggered by data received from the vehicle diagnostic harness and processed by the diagnostic module 202. The notification includes a fault code (i.e., P0300) indicating an engine misfire detected through the vehicle's diagnostic harness. In certain examples, other vehicle conditions may be detected through various sensor devices 103 associated with the vehicle gateway 102. The system analyzes these detected conditions, whether from engine diagnostic data or other vehicle sensors, using historical vehicle data to determine both an estimated service time of one hour and a historical resolution rate of 37%. Through the diagnostic module 202, the system processes both diagnostic harness data and sensor device inputs to evaluate vehicle conditions and determine appropriate responses based on the specific type of detected issue.

Based on the analysis of the fault code severity and historical service data, the system generates a recommended action 606 that may in some examples include routing to a specific service location based on multiple factors including: the vehicle's current location, time of day, the severity of the detected condition, the vehicle's assigned route and remaining stops, availability of compatible service providers, estimated service delays, and potential impact on delivery schedules. The system considers factors like current vehicle location, route progress, and availability of replacement vehicles when determining appropriate route modifications. Additionally, the system analyzes the confidence score for successful roadside repair, checks the availability of nearby service locations, and assesses the criticality of remaining route stops to determine the most appropriate course of action. When selecting service locations, the system identifies service providers within an acceptable detour range and calculates optimal route modifications to minimize delivery disruptions. The interface may display both the original arrival time (i.e., 3:27 PM) and a new estimated time of arrival (i.e., 4:27 PM) calculated by incorporating the proposed service stop into the route.

The system implements the presentation module 208 to display this information within a map image at the client device 122 based on location data accessed from the vehicle. The interface provides interactive elements allowing the driver to either accept the proposed route modification or continue with their original route, facilitating driver decision-making based on the severity of the vehicle condition and potential impact on delivery schedules.

Figure 7:
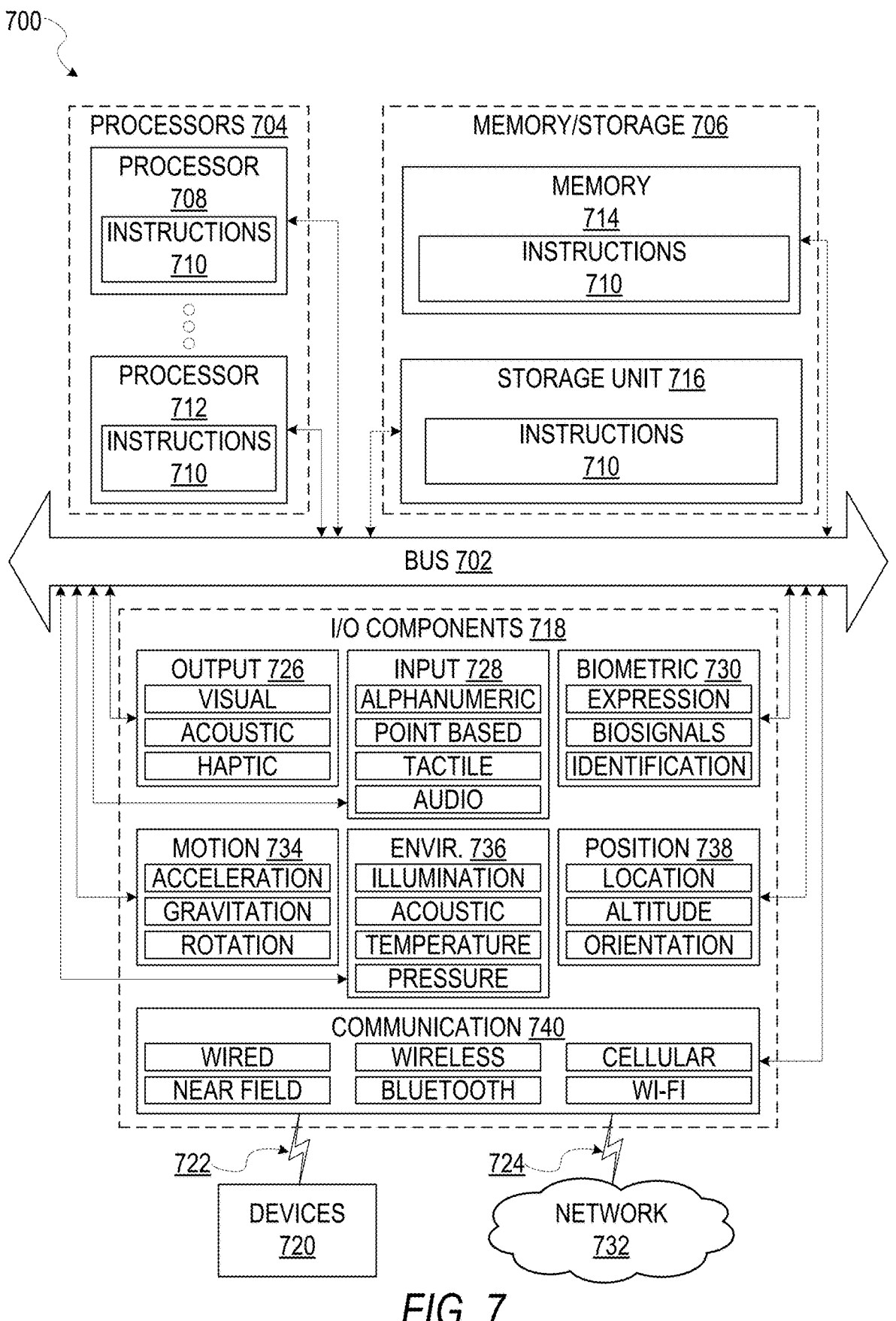
FIG. 7 is a block diagram illustrating components of a machine, according to certain examples, able to read instructions from a machine-readable storage medium and perform the methodologies for vehicle diagnostic aware route planning discussed herein.

FIG. 7 is a block diagram illustrating components of a machine 700, according to certain examples, able to read instructions from a machine-readable storage medium and perform the methodologies for vehicle diagnostic aware route planning discussed herein. Specifically, FIG. 7 shows a diagrammatic representation of the machine 700 in the example form of a computer system, within which instructions 710 for causing the machine 700 to perform vehicle diagnostic data analysis and route modification may be executed. The instructions 710 transform the general, non-programmed machine 700 into a particular machine 700 programmed to receive diagnostic data, determine vehicle parameters, detect conflicts, and modify routes.

The machine 700 includes processors 704 that execute instructions for the route management system, including diagnostic analysis, historical data processing, route analysis and route modification modules. The memory/storage 706 may include a memory 714 and a storage unit 716, both accessible to the processors 704 via the bus 702. The storage unit 716 and memory 714 store the instructions 710 embodying the methodologies described herein. The instructions 710 may reside within the memory 714, storage unit 716, processors 704, or any combination thereof during execution.

The I/O components 718 include components configured to receive diagnostic data from vehicle diagnostic harnesses and provide navigation outputs. The output components 726 may include visual components for displaying navigation instructions, route modifications, and service notifications. The input components 728 are configured to receive diagnostic data and VIN information from vehicles.

The I/O components 718 may include biometric components 730, motion components 734, environmental components 736, or position components 738. The motion components 734 include acceleration sensor components, gravitation sensor components, and rotation sensor components. The environmental components 736 include illumination sensor components, temperature sensor components, pressure sensor components, and acoustic sensor components. The position components 738 include location sensors for tracking vehicle positions along routes.

Communication may be implemented using various technologies. The I/O components 718 include communication components 740 operable to couple the machine 700 to a network 732 or devices 720. The communication components 740 include wired communication components, wireless communication components, cellular communication components, Near Field Communication (NFC) components, Bluetooth® components, and Wi-Fi® components. The components support transmission of diagnostic data, route information, and navigation instructions between system components.

The communication components 740 enable data collection from the distributed vehicle network, allowing the system to maintain current vehicle diagnostic information and route status across the fleet. The components support transmission of live diagnostic data, service requirements, and other detected conditions to provide situational awareness for route planning and fleet operations.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

What is claimed is:

1. A method comprising:
   receiving diagnostic data from a vehicle diagnostic harness of a vehicle assigned to a route, the route comprising one or more stops;
   accessing historical vehicle data based on the diagnostic data;
   determining a vehicle parameter based on the diagnostic data and the historical vehicle data, the vehicle parameter comprising a fault code;
   determining an estimated service delay based on the historical vehicle data and the fault code; and
   modifying the route of the vehicle to include a service location based on the estimated service delay.

2. The method of claim 1, wherein the modifying the route of the vehicle based on the estimated service delay further comprises:
   identifying a replacement vehicle based on the vehicle parameter; and
   assigning the route to the replacement vehicle.

3. The method of claim 1, wherein the one or more stops comprise at least a first stop, and the modifying the route of the vehicle to include the service location includes:
   identifying a second stop based on the vehicle parameter, the second stop including the service location; and
   replacing the first stop with the second stop in the route.

4. The method of claim 1, wherein the modifying the route of the vehicle includes:
   performing a comparison of the estimated service delay to a threshold value; and
   adding the service location to the route based on the comparison.

5. The method of claim 1, wherein the determining the vehicle parameter comprises:
   analyzing vehicle identification number (VIN) data and diagnostic data; and
   determining at least one of:
   vehicle configurations;
   auxiliary equipment of the vehicle;

vehicle dimensions; or vehicle weight.

6. The method of claim 1, wherein the method further comprises:

identifying route attributes along the route;

determining the vehicle parameter is incompatible with at least one route attribute; and modifying the route of the vehicle based on the route attributes.

7. The method of claim 6, wherein the route attributes comprise at least one of:

road restrictions;

weather conditions;

construction zones; or geofenced areas.

8. The method of claim 1, wherein:

the vehicle parameter indicates a vehicle condition; and modifying the route further comprises:

determining a severity of the vehicle condition; and presenting a notification at a client device based on the severity of the vehicle condition.

9. The method of claim 8, wherein the presenting a notification at the client device includes:

accessing location data from the vehicle; and presenting the notification within a map image at the client device based on the location data, wherein the notification includes a display of the vehicle condition.

10. A system comprising:

a memory; and at least one hardware processor to perform operations comprising:

receiving diagnostic data from a vehicle diagnostic harness of a vehicle assigned to a route, the route comprising one or more stops;

accessing historical vehicle data based on the diagnostic data;

determining a vehicle parameter based on the diagnostic data and the historical vehicle data, the vehicle parameter comprising a fault code;

determining an estimated service delay based on the historical vehicle data and the fault code; and modifying the route of the vehicle to include a service location based on the estimated service delay.

11. The system of claim 10, wherein the modifying the route of the vehicle based on the estimated service delay further comprises:

identifying a replacement vehicle based on the vehicle parameter; and assigning the route to the replacement vehicle.

12. The system of claim 10, wherein the one or more stops comprise at least a first stop, and the modifying the route of the vehicle to include the service location includes:

identifying a second stop based on the vehicle parameter, the second stop including the service location; and replacing the first stop with the second stop in the route.

13. The system of claim 10, wherein the modifying the route of the vehicle includes:

performing a comparison of the estimated service delay to a threshold value; and adding the service location to the route based on the comparison.

14. The system of claim 10, wherein the determining the vehicle parameter comprises:

analyzing vehicle identification number (VIN) data and diagnostic data; and determining at least one of:

vehicle configurations;

auxiliary equipment of the vehicle;

vehicle dimensions; or vehicle weight.

15. The system of claim 10, wherein the method further comprises:

identifying route attributes along the route;

determining the vehicle parameter is incompatible with at least one route attribute; and modifying the route of the vehicle based on the route attributes.

16. The system of claim 15, wherein the route attributes comprise at least one of:

road restrictions;

weather conditions;

construction zones; or geofenced areas.

17. The system of claim 10, wherein:

the vehicle parameter indicates a vehicle condition; and modifying the route further comprises:

determining a severity of the vehicle condition; and presenting a notification at a client device based on the severity of the vehicle condition.

18. The system of claim 17, wherein the presenting a notification at the client device includes:

accessing location data from the vehicle; and presenting the notification within a map image at the client device based on the location data, wherein the notification includes a display of the vehicle condition.

19. A non-transitory machine-readable storage medium comprising instructions that, when executed by one or more processors of a machine, cause the machine to perform operations comprising:

receiving diagnostic data from a vehicle diagnostic harness of a vehicle assigned to a route, the route comprising one or more stops;

accessing historical vehicle data based on the diagnostic data;

determining a vehicle parameter based on the diagnostic data and the historical vehicle data, the vehicle parameter comprising a fault code;

determining an estimated service delay based on the historical vehicle data and the fault code; and modifying the route of the vehicle to include a service location based on the estimated service delay.

20. The non-transitory machine-readable storage medium of claim 19, wherein the modifying the route of the vehicle based on the estimated service delay further comprises:

identifying a replacement vehicle based on the vehicle parameter; and assigning the route to the replacement vehicle.

* * * * *